United States Patent
Simon Bacardit

[19]

[11] Patent Number: 6,000,220
[45] Date of Patent: Dec. 14, 1999

[54] COMPACT DUAL MASTER CYLINDER WITH OFFSET PRIMARY OUTLET

[75] Inventor: Juan Simon Bacardit, Drancy, France

[73] Assignee: Bosch Sistemas de Frenado S.L., Barcelona, Spain

[21] Appl. No.: 09/029,281

[22] PCT Filed: Feb. 12, 1998

[86] PCT No.: PCT/FR98/00268

§ 371 Date: Mar. 3, 1998

§ 102(e) Date: Mar. 3, 1998

[87] PCT Pub. No.: WO98/42555

PCT Pub. Date: Oct. 1, 1998

[30] Foreign Application Priority Data

Mar. 21, 1997 [FR] France .................................. 97 03453

[51] Int. Cl.⁶ .................................................. B60T 11/20
[52] U.S. Cl. .................................................. 60/562
[58] Field of Search ................................................ 60/562

[56] References Cited

U.S. PATENT DOCUMENTS

| 4,524,585 | 6/1985 | Coll et al. | 60/562 |
| 4,685,301 | 8/1987 | Bacardit et al. | 60/562 |
| 5,187,934 | 2/1993 | Mori | 60/562 |

FOREIGN PATENT DOCUMENTS 4120668  12/1992  Germany .................................. 60/562

*Primary Examiner*—F. Daniel Lopez
*Attorney, Agent, or Firm*—Leo H McCormick J.; Warren Comstock

[57] ABSTRACT

A tandem hydraulic master cylinder having body (1) pierced with a bore having first (2a) and second (2b) inlets for receiving hydraulic fluid at low pressure. A primary piston (3) and a secondary piston (4) respectively slide in first (S1) and second (S2) length sections of the bore of body (1). A primary pressure chamber (5) is located in the bore between the primary piston (3) and the secondary piston (4) and a secondary chamber (6) is located between the secondary piston a bottom of the bore. First and second upstream and downstream sealing cups (91a,91b) and 92a,92b) respective seal the bore and the primary chamber (5) and the secondary chamber (6). The primary chamber (5) has a first re-supply duct (21) and a first outlet orifice (41) and the secondary chamber (6) has a second re-supply duct (22) and a second outlet orifice (42) for receiving and communicating hydraulic fluid. The primary (3) and secondary (4) are guided by the wall (100) of the bore while the body (1) has a first longitudinal passage (51) connecting the first downstream cup (91b) the second upstream cup (92a) and the first outlet orifice (41) with the primary chamber (5) via a first radial passage (61) situated between the first and second length sections (S1,S2).

4 Claims, 2 Drawing Sheets

COMPACT DUAL MASTER CYLINDER WITH OFFSET PRIMARY OUTLET

The present invention relates to a tandem hydraulic master cylinder comprising:

a body pierced with a longitudinal bore delimited by an at least partially cylindrical wall, a first end of which forms an opening, and a second end of which is closed by a bottom, the first and second ends being separated by a distance over which first and second length sections contiguous with one another are defined, and this body exhibiting an upper part in which first and second inlets for a hydraulic fluid at low pressure are pierced;

a primary piston and a secondary piston, of cylindrical shape, both capable of sliding respectively in the first and second length sections;

a primary pressure chamber defined in the first length section between the primary and secondary pistons, this chamber containing at least one first spring exerting between the pistons a first elastic force which tends to separate these pistons from one another;

a second pressure chamber defined in the second length section between the secondary piston and the bottom, this chamber containing at least one second spring exerting between the secondary piston and the bottom a second elastic force in a direction which tends to separate this secondary piston from the bottom;

at least four sealing cups which are secured to the body and comprise first upstream and downstream cups sealing the primary chamber and surrounding the primary piston, and second upstream and downstream cups surrounding the secondary piston and separating the primary and secondary pressure chambers in a leaktight fashion, each downstream cup being closer to the bottom of the body than the upstream cup which surrounds the same piston;

a first resupply duct connecting the first fluid inlet to a first intermediate volume situated between the first upstream and downstream cups, a second resupply duct connecting the second fluid inlet to a second intermediate volume situated between the second upstream and downstream cups; and first and second orifices situated in the upper part of the body, communicating respectively with the primary and secondary pressure chambers and constituting the respective outlets from these chambers, the first orifice being situated in the second length section and between the first downstream cup and the second upstream cup.

BACKGROUND OF THE INVENTION

A master cylinder of this type is known in the prior art, and depicted, for example, in patent document EP-0,387,012.

The master cylinder described in this document, essentially designed to exhibit satisfactory axial compactness, does, however, employ a cylindrical cartridge inside the body, and this necessarily leads to a not insignificant increase in the outside diameter of the master cylinder.

Moreover, insofar as the internal arrangement of this master cylinder is designed in such a way that the cartridge is some distance from the primary piston, the latter is, by construction, deprived of effective guidance which means that any oblique thrust during actuation of the master cylinder carries the risk of causing the primary piston to jam in the bore.

SUMMARY OF THE INVENTION

In this context, the present invention sets out to overcome the aforementioned drawbacks.

Thus the master cylinder according to the invention, which in other respects is in accordance with the definition thereof given in the preamble above, is essentially characterized in that the primary and secondary pistons are guided by the wall of the bore, with which they are in contact, and in that the body is furthermore pierced with a first longitudinal passage connecting the first downstream cup, the second upstream cup and the first orifice and communicating with the primary pressure chamber via at least one first radial passage situated between the first and second length sections.

In an embodiment suited to mass production, the bottom may comprise a blanking piece attached to the body and slidably accommodating the secondary piston, it then being possible for this blanking piece to be pierced with a second longitudinal passage placing the second downstream cup in communication with the second orifice and with a second radial passage placing the second orifice in communication with the secondary pressure chamber.

The resupply to the primary pressure chamber can be accelerated if the master cylinder is provided with a cylindrical resupply connection inserted in the first resupply duct and passing through the first downstream cup to reach the first intermediate volume directly.

Furthermore, it may be advantageous to make provision for a guide piece carrying the first upstream cup to be mounted on the first end of the wall to optimize guidance of the primary piston.

Other features and advantages of the invention will emerge clearly from the description thereof given hereafter by way of non-limiting indication with reference to the appended drawings.

DETAILED DESCRIPTION OF THE INVENTION

Figure 1:
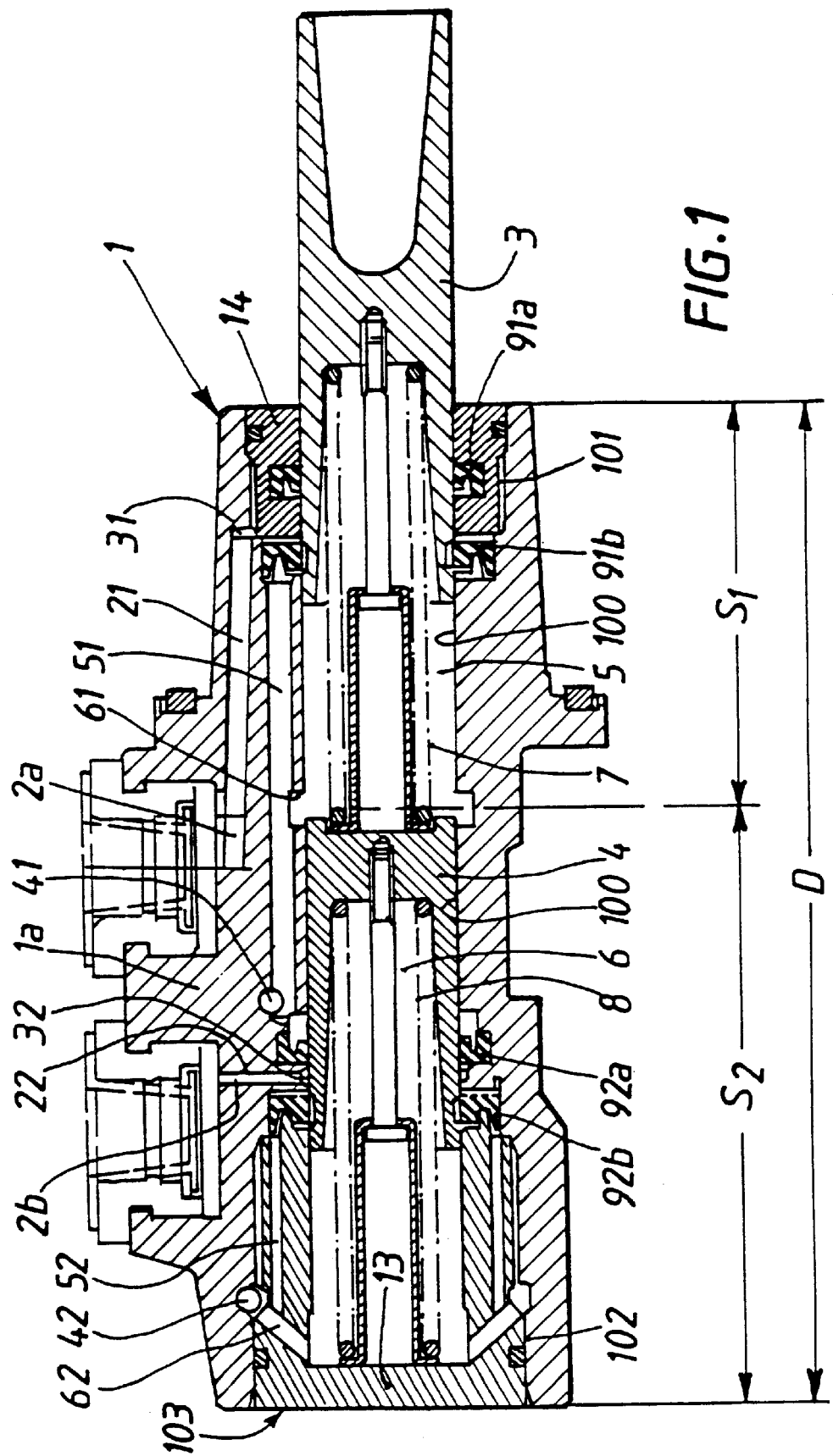
FIG. 1 is a sectional view through a master cylinder in accordance with a first alternative embodiment of the invention.

The invention relates to a tandem hydraulic master cylinder mainly comprising a body 1, first and second inlets 2a, 2b for a hydraulic fluid at low pressure, a primary piston 3 and a secondary piston 4, a primary pressure chamber 5, a secondary pressure chamber 6, four sealing cups 91a, 91b, 92a, 92b, first and second resupply ducts 21, 22 and first and second outlet orifices 41 and 42 for the pressurized hydraulic fluid.

The body 1 is pierced with a longitudinal bore delimited by an at least partially cylindrical wall 100, a first end 101 of which forms an opening, and a second end 102 of which is closed by a bottom 103.

The first and second ends 101 and 102 are separated by a distance D over which first and second length sections S1, S2 contiguous with one another are defined.

The first and second inlets 2a, 2b for the hydraulic fluid at low pressure are pierced in the upper part 1a of the body 1. The primary piston 3 and secondary piston 4, which are of cylindrical shape, are arranged in the bore in such a way that they can slide respectively in the first and second length sections S1, S2.

The primary pressure chamber 5 is defined at least in part in the first length section S1 and is delimited by the primary and secondary pistons 3, 4, this chamber 5 containing at least one first preloaded spring 7 exerting between the pistons a first elastic force which tends to separate these pistons from one another.

The secondary pressure chamber 6 is defined in the second length section S2 between the secondary piston 4 and the bottom 103, this chamber 6 containing at least one second preloaded spring 8 exerting between the secondary piston and the bottom 103 a second elastic force in a direction which tends to separate this secondary piston from the bottom.

The four ceiling cups 91a, 91b, 92a, 92b are secured to the body 1 and comprise first upstream and downstream cups 91a, 91b sealing the primary chamber 5 and surrounding the primary piston 3, and second upstream and downstream cups 92a, 92b surrounding the secondary piston 4 and separating the primary and secondary pressure chambers 5, 6 in a leaktight manner, each downstream cup 91b, 92b being closer to the bottom 103 of the body than the upstream cup 91a, 92a that surrounds the same piston.

The first resupply duct 21 connects the first fluid inlet 2a to a first intermediate volume 31 situated between the first upstream and downstream cups 91a, 91b, while the second resupply duct 22 connects the second fluid inlet 2b to a second intermediate volume 32 situated between the second upstream and downstream cups 92a, 92b.

The first and second orifices 41, 42 which constitute the respective outlets from the primary and secondary pressure chambers 5 and 6 for the pressurized hydraulic fluid are situated in the upper part 1a of the body and communicate respectively with these primary and secondary pressure chambers 5, 6, the first orifice 41 being situated in the second length section S2 and between the first downstream cup 91b and the second upstream cup 92a.

According to the invention, as shown in FIG. 1, the primary and secondary pistons 3, 4 are guided by the wall 100 of the bore, with which they are in contact, and the body 1 is furthermore pierced with a first longitudinal passage 51 connecting the first downstream cup 91b, the second upstream cup 92a and the first orifice 41 and communicating with the primary pressure chamber 5 via a first radial passage 61 situated between the first and second length sections S1, S2.

The bottom 103 may comprise a blanking piece 13 attached to the body and slidably accommodating the secondary piston 4, this blanking piece being pierced with a second longitudinal passage 52 placing the second downstream cup 92b in communication with the second orifice 42 and with a second radial passage 62 placing the second orifice 42 in communication with the secondary pressure chamber 6.

Figure 2:
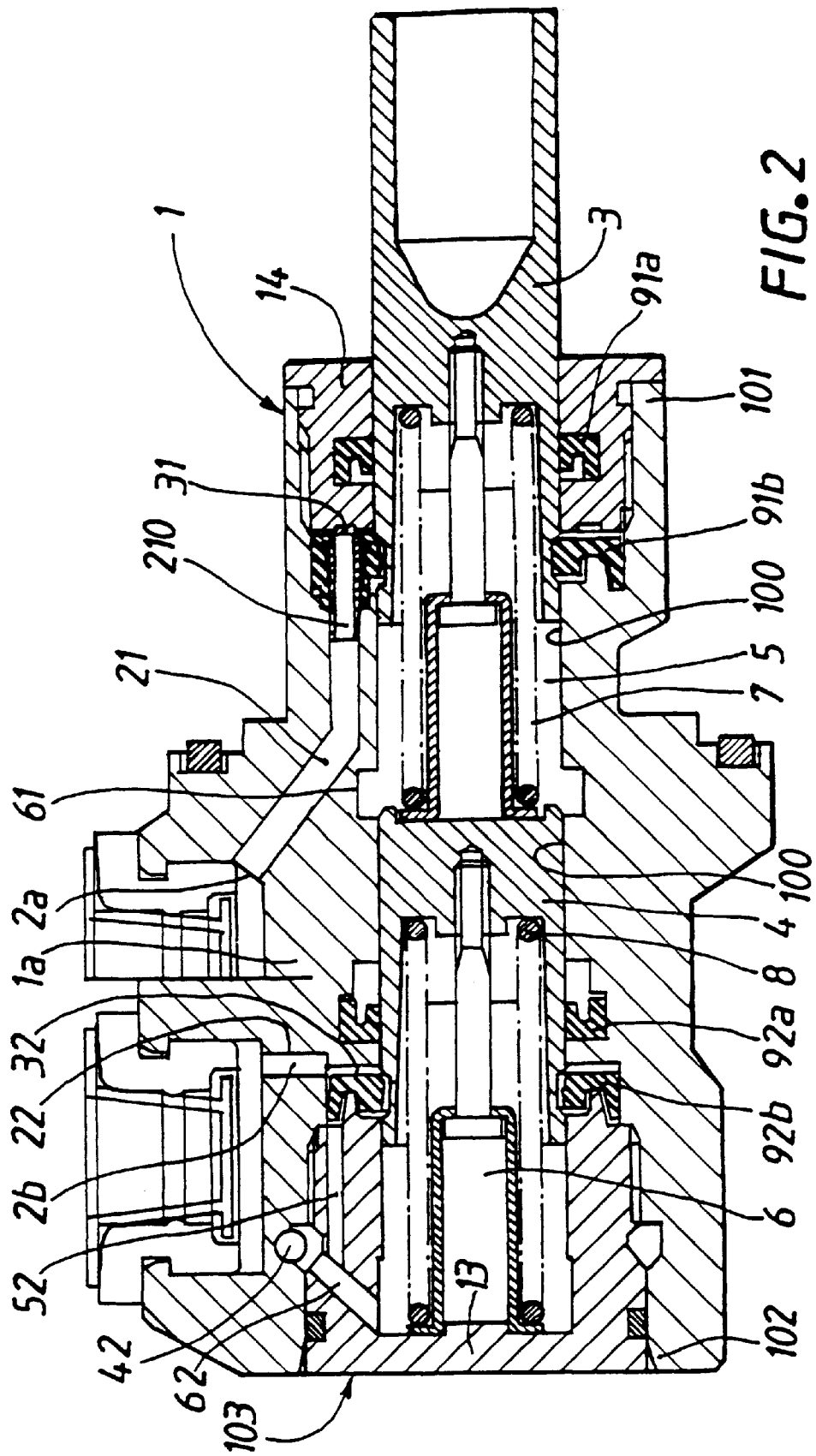
FIG. 2 is a sectional view through a master cylinder in accordance with a second alternative embodiment of the invention.

FIG. 2 illustrates an alternative embodiment of the master cylinder of FIG. 1, in which the first resupply duct 21 and the first longitudinal passage 51 are not coplanar, the first longitudinal passage 51 therefore not having been depicted in this figure, for clarity.

Furthermore, as shown in FIG. 2, a cylindrical resupply connection 210 may be inserted in the first resupply duct 21 to pass through the first downstream cup 91b and reach the first intermediate volume 31 directly.

Finally, as shown in FIGS. 1 and 2, it may be advantageous to improve the guidance of the primary piston by providing a guide piece 14 carrying the first upstream cup 91a and mounted on the first end 101 of the wall 100.

I claim:

1. A tandem hydraulic master cylinder comprising:

a body pierced with a longitudinal bore delimited by an at least partially cylindrical wall, a first end of which forms an opening, and a second end of which is closed by a bottom, said first and second ends being separated by a distance over which first and second length sections contiguous with one another are defined, said body having an upper part in which first and second inlets for a hydraulic fluid at low pressure are pierced;

a primary piston and a secondary piston, of cylindrical shape, said primary and secondary pistons being capable of sliding respectively in said first and second length sections;

a primary pressure chamber defined at least in part by said first length section between the primary and secondary pistons, said primary pressure chamber containing at least a first spring located between said primary and secondary pistons which exerts a first elastic force to separate said primary piston from said secondary piston;

a secondary pressure chamber defined in said second length section between said secondary piston and said bottom, said secondary chamber containing at least a second spring located between said secondary piston and said bottom which exerts a second elastic force to separate said secondary piston from said bottom;

at least four sealing cups which are secured to said body and comprise: first upstream and downstream cups for sealing said primary chamber and surrounding said primary piston; and second upstream and downstream cups surrounding said secondary piston and separate said primary and secondary pressure chambers in a leaktight fashion, each of said downstream cup being closer to the bottom of said body than said upstream cup which surrounds a corresponding piston; a first re-supply duct connecting said first fluid inlet to a first intermediate volume situated between said first upstream and downstream cups;

a second re-supply duct connecting said second fluid inlet to a second intermediate volume situated between said second upstream and downstream cups;

first and second orifices situated in said upper part of said body for respectively communicating with said primary and secondary pressure chambers and constituting respective first and second outlets from said primary and secondary chambers, said first orifice being situated in said second length section between said first downstream cup and the second upstream cup; and said primary and secondary pistons being guided by said wall of the bore, characterized in that said primary and secondary pistons are in contact with said wall of the bore, and in that said body is furthermore pierced with a first longitudinal passage connecting said first downstream cup, said second upstream cup and said first orifice and communicating with said primary pressure chamber via at least one first radial passage situated between said first and second length sections.

2. The master cylinder according to claim 1, characterized in that said bottom comprises a blanking piece attached to said body and slidably accommodating said secondary piston and said blanking piece is pierced with a second longitudinal passage placing said second downstream cup in communication with said second orifice and with a second radial passage placing said second orifice in communication with said secondary pressure chamber.

3. The master cylinder according to claim 1, further comprising a cylindrical re-supply connection inserted in said first re-supply duct and passing through said first downstream cup to directly reach an intermediate volume.

4. The master cylinder according to claim 1, further comprising a guide piece which carries said first upstream cup is mounted on said first end of said wall to guide said primary piston.

\* \* \* \* \*